United States Patent
Abelard et al.

(10) Patent No.: US 7,130,526 B2
(45) Date of Patent: Oct. 31, 2006

(54) METHOD AND DEVICE FOR DECODING A VIDEO STREAM IN TRICK MODE

(75) Inventors: Franck Abelard, Chateaubourg (FR); Alain Verdier, Vern sur Seiche (FR)

(73) Assignee: Thomson Licensing, Boulogne-Billancourt (FR)

( * ) Notice: Subject to any disclaimer, the term of this patent is extended or adjusted under 35 U.S.C. 154(b) by 1035 days.

(21) Appl. No.: 09/849,570

(22) Filed: May 4, 2001

(65) Prior Publication Data
US 2002/0001458 A1 Jan. 3, 2002

(30) Foreign Application Priority Data
May 19, 2000 (EP) .................................. 00401381

(51) Int. Cl.
H04N 5/91 (2006.01)
H04N 7/26 (2006.01)

(52) U.S. Cl. .......................... 386/68; 386/125; 386/111

(58) Field of Classification Search ................ 386/6–8, 386/33, 68–70, 81–82, 111–112, 125; 375/240.05, 375/240.07, 240.12; H04N 5/76, 5/781, H04N 7/12
See application file for complete search history.

(56) References Cited

U.S. PATENT DOCUMENTS

| | | | |
|---|---|---|---|
| 5,892,882 A * | 4/1999 | Kuroda et al. ................. 386/68 |
| 6,009,231 A * | 12/1999 | Aoki et al. ..................... 386/68 |
| 6,078,693 A * | 6/2000 | Kawamura et al. ......... 382/238 |
| 6,233,392 B1 * | 5/2001 | Comer ......................... 386/68 |
| 6,453,114 B1 * | 9/2002 | Schultz et al. ................. 386/68 |
| 6,751,400 B1 * | 6/2004 | Matsumura et al. .......... 386/68 |
| 6,834,155 B1 * | 12/2004 | Taniguchi ..................... 386/68 |

FOREIGN PATENT DOCUMENTS

EP 0725399 A2 8/1996

OTHER PUBLICATIONS

Search Report & Priority Document.

* cited by examiner

Primary Examiner—Robert Chevalier
(74) Attorney, Agent, or Firm—Joseph J. Laks; Robert B. Levy; Jorge Tony Villabon (57) ABSTRACT

A device for decoding a video stream in trick mode includes a random access source of coded video pictures, a means for establishing an order for pictures to be decoded, a plurality of reconstruction buffers for storing decoded pictures, and a video decoder for decoding coded pictures. The decoding device further includes a means for monitoring the availability of the reconstruction buffers. In one embodiment, a method of the present invention performed, for example by the coding device, includes establishing an order of decoding pictures and commanding the video decoder to decode a picture upon availability of a reconstruction buffer.

9 Claims, 7 Drawing Sheets

| BUFFERS | | | FRAME PERIOD | DISPL. PICTURE | DECODING PER FR. PERIOD |
| --- | --- | --- | --- | --- | --- |
| A | B | C | | | |
|  | B"3 |  | -4 | B"3 | 2 |
| I2 |  |  |  |  |  |
|  | P5 |  | -3 | I"2 | 3 |
| P8 |  |  |  |  |  |
|  |  | P11 |  |  |  |
| B"1 |  |  | -2 | B"1 | 1 |
| B"0 |  |  | -1 | B"0 | 2 |
|  |  | I2 |  |  |  |
| P5 |  |  | 0 | P11 | 3 |
|  |  | P8 |  |  |  |
| B10 |  |  |  |  |  |
|  |  |  | 1 | B10 | 0 |
| B9 |  |  |  | B9 | 2 |
|  | I2 |  |  |  |  |
| P5 |  |  | 2 | P8 | 2 |
|  | B7 |  |  |  |  |
|  |  |  | 3 | B7 | 0 |
|  | B6 |  |  | B6 | 2 |
|  |  | I2 |  |  |  |
|  | B4 |  | 4 | P5 | 1 |
|  |  |  | 5 | B4 | 0 |
|  | B3 |  | 6 | B3 | 2 |
| I'2 |  |  |  |  |  |
|  | P'5 |  | 7 | I2 | 3 |
| P'8 |  |  |  |  |  |
|  | P'11 |  |  |  |  |
| B1 |  |  | 8 | B1 | 1 |
| B0 |  |  | 9 | B0 | 1 |

TIME

FIG. 7

METHOD AND DEVICE FOR DECODING A VIDEO STREAM IN TRICK MODE

FIELD OF THE INVENTION

In a system where an MPEG video stream is stored in a storage device (for example a Hard Disk Drive—HDD—integrated into a digital video decoder set top box) and can be read back and presented with the use of an MPEG decoder, the possibility of trickmode play such as reverse playback at different speeds is naturally expected by the user.

BACKGROUND OF THE INVENTION

The presentation of an MPEG encoded video sequence in the reverse direction is a difficult problem considering that in an MPEG stream structure, a video access unit, corresponding to data representing one coded picture, may depend on previously transmitted pictures. Indeed, video access units are sent in an order which facilitates their decoding for display in forward direction. Thus, three reconstruction buffers are sufficient to decode the stream in this direction.

When playback in the reverse direction is required. be it at the normal rate or at an accelerated rate, one solution consists in decoding all pictures corresponding a group of pictures (generally 12 pictures) before displaying any picture from this group of pictures. The last picture (in forward direction display order) of such a group may indeed depend on the first picture of the group, which is an intra type picture. Only some of these decoded pictures may be displayed, depending on the playback speed.

Usual video decoders carry out one picture decoding per display period (e.g. 40 ms). This is not adapted to trickmode playback.

SUMMARY OF THE INVENTION

The object of the invention is a method for decoding compressed video pictures in a video decoding device comprising a random access source of coded video pictures, a video decoder and a plurality of reconstruction buffers for storing decoded pictures, characterized by the steps of:
establishing an order of decoding pictures according to a display mode;
commanding said video decoder in an asynchronous manner to decode a picture upon availability of a reconstruction buffer. As soon as a reconstruction buffer becomes available, the next picture in line is decoded. The decoder does not decode one picture per display period, but anticipates the decoding of pictures in a predefined order. In particular in case of reverse trickmode replay, this is important since a given picture may in some cases depend on four or more pictures which all need to be decoded in advance.

According to an embodiment, the method moreover comprises the following steps:
locking access to a reconstruction buffer containing a picture to be displayed until display of said picture;
commanding the decoding of a further picture upon availability of an unlocked reconstruction buffer.

The decoding is thus controlled by the display process: it is this process which unlocks access to reconstruction buffers and thus controls when the next picture is decoded.

According to an embodiment, the step of establishing an order for decoding pictures comprises the steps of:

determining a list of pictures to be displayed among pictures in said stream;
recursively determining chains of predictors for said pictures to be displayed, and inserting said predictors in said list of pictures to be displayed in the order required for decoding predictors before pictures depending on said predictors.

According to an embodiment, the compressed video stream comprises pictures in the order of decoding, and the method further comprises the steps of determining for a bi-directional picture a nearest and a farthest predictor, where said nearest predictor is the picture appearing in the stream closest to said bi-directional picture, said farthest predictor being decoded prior to said nearest predictor.

According to an embodiment, the step of determining an order of decoding pictures comprises the steps of:
loading predetermined information descriptive of the contents of the video stream, and
deriving said order of decoding pictures from said information as a function of a selected display mode.

According to an embodiment, the method moreover comprises the step of selecting a reconstruction buffer among available reconstruction buffers for storage of a decoded picture, said selection being carried out so as to select the available reconstruction buffer in which no decoded picture to be displayed has been stored for the longest time.

According to an embodiment, the method further comprises the step of attributing a counter to each reconstruction buffer, of incrementing each counter every time a picture is displayed, of resetting a counter when a picture of its associated buffer is displayed and of attributing the buffer with the highest counter value to a picture to be decoded.

According to the preferred embodiment, the method is carried out using only three reconstruction buffers, but is not necessarily limited to that number.

According to an embodiment, the method further comprises the steps of verifying prior to the decoding of a picture, whether said picture is already present in one of the reconstruction buffers, and of avoiding a second decoding of said picture in this case.

Another object of the invention is a video decoding device characterized by
a random access source of a compressed video stream including coded pictures;
means for selecting pictures to be decoded;
a plurality of reconstruction buffers for storing decoded pictures;
a video decoder for decoding coded pictures;
means for monitoring the availability for write access of reconstruction buffers and for controlling said video decoder to decode a selected picture upon availability of a reconstruction buffer, wherein the availability of a reconstruction buffer is determined by the status of the display of a picture contained in said reconstruction buffer.

The random access source may also be an intermediate storage area, connected to a sequential source.

The inventive method and device enable playback of a recorded video stream in reverse direction at different speeds using only three reconstruction buffers.

In order to decode a selected picture, the inventive method determines and decodes, using a recursive process, the predictor pictures of a picture to be displayed.

Advantageously, predetermined trickmode information describing the recorded stream is used to determine predictor pictures. This trickmode information may take the form of a linked list of picture descriptors describing their type and the location of relevant data in the recorded stream.

A specific buffer allocation mechanism is used in order to determine which reconstruction buffer is to be used for which picture.

Write access to a buffer containing a picture to be displayed is disabled until this picture has been displayed.

BRIEF DESCRIPTION OF THE DRAWINGS

Other characteristics and advantages of the invention will appear through the description of a non-limiting embodiment of the invention. The following drawings illustrate the embodiment.

DETAILED DESCRIPTION

1. Complete System Overview

Figure 1:
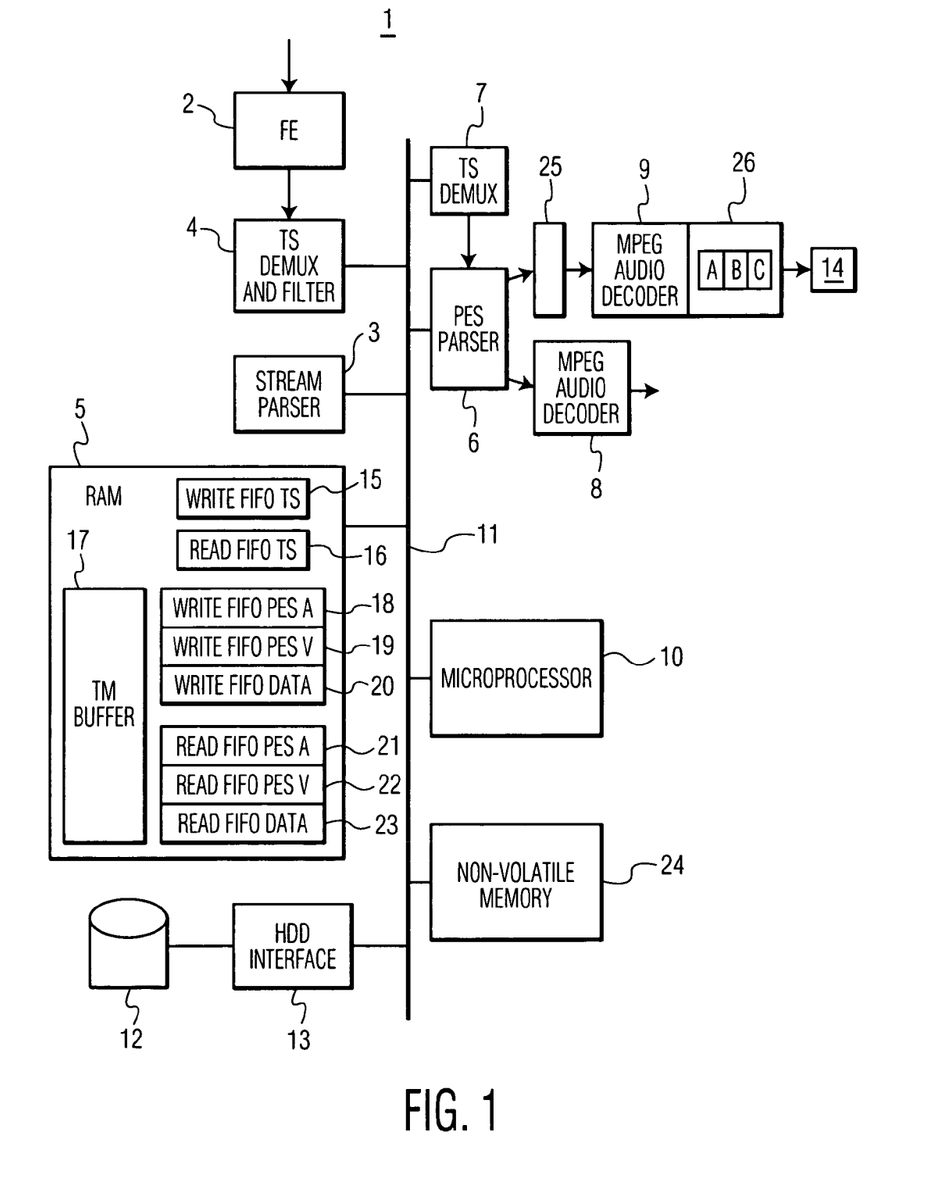
FIG. 1 is a block diagram of a digital television receiver/decoder.

The digital television receiver/decoder 1 of FIG. 1 comprises a Forward Error Correction circuit 2 fed by a tuner and analog/digital converter (not shown). The corrected digital signal is fed to a Transport Stream demultiplexer and filter 4. This demultiplexer and filter 4 is connected to the central communication bus 11 of the receiver 1. Its role is to select certain Transport Stream (TS) packets in the incoming data stream and to dispatch them to different applications of the receiver. For that purpose, it comprises filters programmed by a microprocessor 10.

For the purpose of recording MPEG streams, the receiver comprises a hard disk drive 12 linked to the bus 11 through an interface 13, for example and EIDE interface. A memory 5 comprises several buffers and areas used to store and retrieve information from the hard disk.

The memory 5 comprises circular buffers 15 to 23. A Write FIFO 15 is used to store, in order of arrival from demultiplexer and filter 4, TS packets for recording on the hard disk 12. A Read FIFO 16 is used to store TS packets read from the hard disk. FIFOs 15 and 16 are used to record or read a substream of the received data stream, disregarding the nature of the content of the TS packets. For recording, all TS packets corresponding to programmed criteria are filtered and written to Write FIFO 15 before transfer to hard disk 12. This mode is called the Transport Stream level recording mode, and will be the mode used in the rest of this description.

For the sake of completeness, it is mentioned that recording can also be achieved at the Packetized Elementary Stream (PES) level. FIFOs 18 to 23 are used for that purpose. Memory 5 also holds a trickmode buffer 17. This buffer is used by the Stream Parser 3 and the microprocessor during recording to generate trickmode information, which is then recorded on the hard disk. This buffer is also used during reproduction to store trickmode information read from the hard disk.

Further details of these two modes can be found in the already mentioned European patent application.

For the purpose of decoding a stream, the receiver 1 also comprises respective audio and video decoders 8 and 9, connected to the central bus 11 either through a Transport Stream demultiplexer and a PES parser 6, or directly through PES parser 6. Depending on the recording mode, the TS layer may or may not have been previously removed. Reference 14 indicates the video processing circuitry required to generate displayable analog video signals.

Compressed data destined to the video decoder 9 is stored in an input bit buffer 25, from where it is read as appropriate by the decoder 9. Reconstructed pictures are stored in a reconstruction memory 26, which is accessed by the decoder for both reading and writing. The reconstruction memory according to the invention has three buffers (A, B, C), each corresponding to one decoded picture.

Receiver 1 also comprises a reprogrammable non-volatile memory 24, which holds the receiver's operating system, device drivers and other software modules. The receiver's software is executed by the microprocessor.

For the purpose of the present description, trickmode information contains for each video access unit stored on the disk and in the order of recording, the type of picture (I, P or B) and the location of the relevant picture, group of picture and sequence information on the hard disk required to decode a picture. Trickmode information is segmented into three different types of tables: A time index table, a video unit description table and several video description units (VDUs), each VDU describing the content of a certain number of successive groups of pictures.

An example of such trickmode information is described in the European patent application entitled "Method and device for decoding a digital video stream in a digital video system using dummy header insertion" filed in the name of THOMSON multimedia on Apr. 5, 2000.

Figure 2:
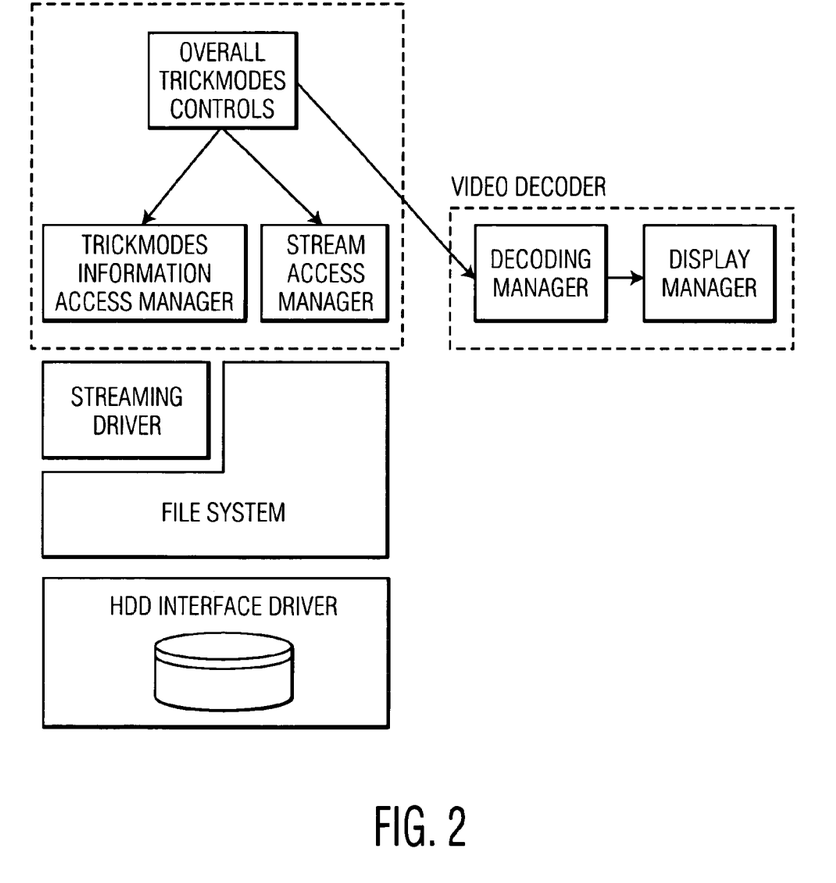
FIG. 2 is a diagram of the software model of the part of the software of the receiver of FIG. 1 corresponding to the operation of the trickmode system.

FIG. 2 is a diagram of the software model of the receiver 1 according to the present embodiment. It comprises the following elements:

(a) Overall trickmode Control:

This software module is in charge of the overall control of the decoding process. According to the trickmode (Backward/Forward, Slow/Fast), this module specifies which picture must be transmitted, decoded, or displayed.

As an example, if the chosen trickmode is fast backward reproduction at X times the regular speed, this module determines, using the temporal index table and the VDUs, which picture has to be displayed, the type of this picture (I, B, P) and, in case of a P or B type picture, the other pictures (predictors) which need to be decoded beforehand. This process is carried out recursively, because the decoding of predictors may itself require other predictors.

Trickmode information is requested by the Overall Trickmode Control from the Trickmode Information Access Manager (see below).

Based on the recursive decoding algorithm, the Overall Trickmode Control instructs the Stream Access Manager (see below) to transfer specific video access units to the MPEG Video Decoder's input buffer.

The Overall Trickmode Control Module maintains a virtual image of the reproduction buffer occupancy at any step.

To decode a picture in a specific one of the three reproduction buffers, it runs the reconstruction buffer selection process described later in relation with the flowcharts of FIGS. 5 and 6, and notifies the Decoding Manager before transferring the compressed picture.

(b) Trickmode Information Access Manager:

The Overall Trickmode Control module needs trickmode information regarding the recorded stream. This information is stored on the hard disk drive 12. The Trickmode Information Access Manager is in charge of collecting the information from the hard disk drive and to supply it to the Overall Trickmode Control.

(c) Stream Access Manager:

Each single picture that must be decoded (whether subsequently to be displayed or not) must be transmitted to the video decoder 9. All the necessary information to access the compressed content is supplied in the trickmode information tables. The Stream Access Manager is in charge of transferring the picture data identified by the Overall Trickmode Control from memory 5, to the video decoder, transferring only relevant information among that read from the hard disk drive by the Streaming Driver. For each picture to be decoded, the Stream Access Manager will be notified by the Overall Trickmode Control.

(d) Streaming Driver:

The Streaming Driver is in charge of sorting out the video content to be delivered to memory 5 for processing by the Stream Access manager. Typically, the Streaming Driver will load one or several blocks from the hard disk drive, containing the relevant data and other data. In the case where trickmode information is inserted along with the stream, the Streaming Driver is also in charge of extracting the trickmode information and of storing it in buffer 17.

(e) Video Decoding Manager:

The video decoder notifies the Video Decoding Manager when it receives and identifies a new video access unit. The Video Decoding Manager has previously received through a queue from the Overall Control a complete command ordering and specifying the decoding and/or the display of this particular picture. Based on this command, the Video Decoding Manager programs the decoding of the newly detected picture and, if the picture must be displayed, notifies the Display Manager through a queue that this picture is to be displayed and how it must be displayed (Top or Bottom field first, forward or backward).

A software descriptor of each reconstruction buffer reflects the state of each buffer. These descriptors are shared by the Video Decoding Manager and the Display Manager. Before programming a decoding, the Video Decoding manager tests if the reconstruction buffer that must receive this picture is available. If it is not, then the Video Decoding Manager waits for the Display Manager to release the buffer. Then, the decoding in this buffer can be programmed and the buffer access can be locked again.

(f) Display Manager:

If a picture must be displayed once decoded, then the Display Manager is notified by the Video Decoding manager. The Display Manager also unlocks locked reconstruction buffers, freeing them for the decoding of further pictures, once they are not needed for display any more.

The video decoder 9 is able to provide an API (application programmable interface) allowing certain types of controls and operations regarding the decoding and eventual display of individual pictures. In particular, the decoder can be instructed to decode an individual picture and to subsequently display it at a given time and for a certain number of frame intervals or not to display it at all.

The picture display is a synchronous process. For a 50 Hz system, the Display Manager checks every 40 ms which picture is to be displayed. In other words, it identifies the reconstruction buffer containing the picture to be displayed.

If the notification queue of the Display Manager filled by the Video Decoding Manager is empty, then no picture is available for display. The last picture displayed will then be repeated, until a new picture is to be displayed.

Typically, the display process is the slowest process in the chain. All other processes will follow the rhythm imposed by the display.

As the decoding process is asynchronous and can be very fast, when a picture to be displayed is decoded, its reconstruction buffer is locked to avoid any overwriting by subsequent pictures before it has been actually displayed. Only the Display Manager is allowed to unlock a buffer when the picture is displayed and when a new picture reconstruction can start in the same buffer. The Video Decoding Manager waits for the Display Manager to display pictures and release buffers, in order to decode new pictures as requested by the Overall Trickmode Control.

The generation of decoding requests by the Overall Trickmode Control and the feeding of the decoder by the Stream Access Manager are also typically faster than the decoding process.

As it is of no use to order new picture decoding if the video decoder's bit-buffer is full and can't be fed with more compressed data, the Overall Trickmode Control and coded picture supply by the Stream Access Manager are synchronized. The Overall Trickmode Control requests the transmission of a new picture when necessary and waits for the transmission to be completed before issuing another request. The completion of the transmission is notified to the Overall Trickmode Control process by the Stream Access Manager.

The Stream Access Manager and the Overall Control wait for the video decoder to retrieve data from the bit buffer, and the video decoder, under the control of the Video Decoding Manager, waits for the Display Manager to release buffers. The whole system will finally follow the display rhythm.

Figure 3:
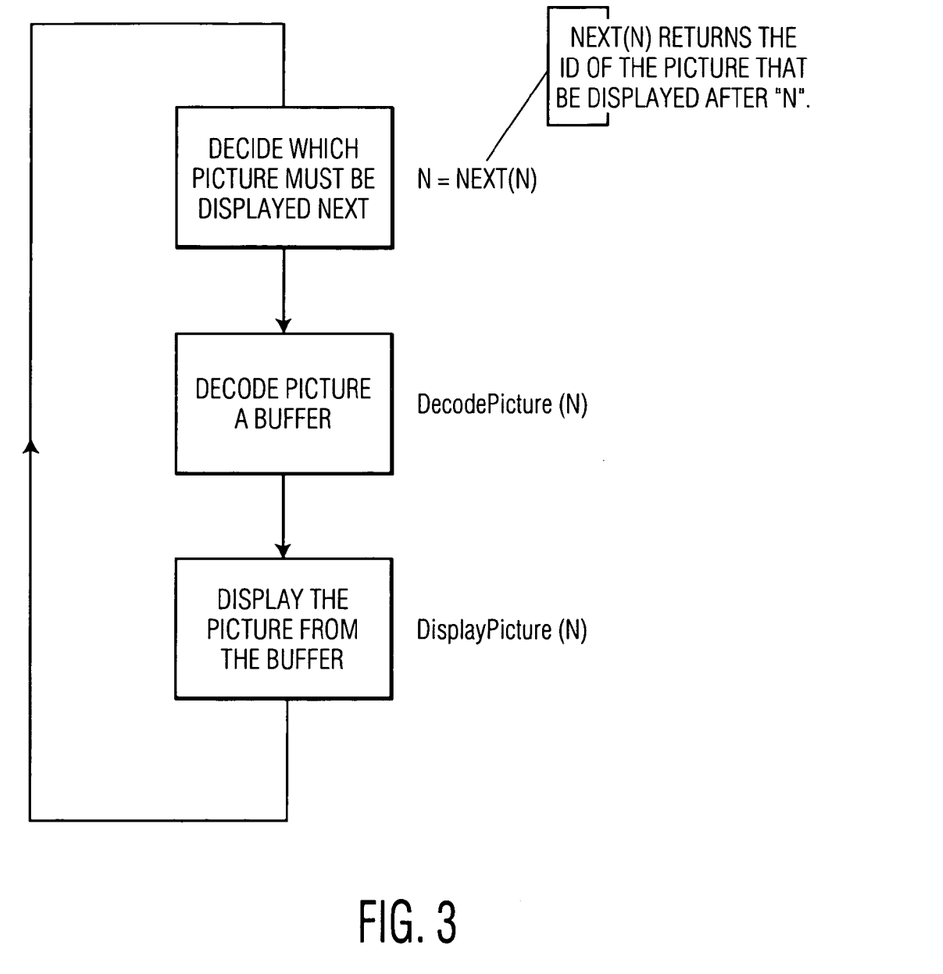
FIG. 3 is a flowchart of the overall video decoding and display process.

To be presented on the display, an MPEG picture must have been previously decoded. The video process can be split into a series of successive operations. FIG. 3 is an overview of the overall video process for a given picture. Several such processes may run in parallel at different stages of execution. A first operation consists in identifying the next picture to be displayed. This of course depends on the type of trickmode. Once this picture is determined, it has to be decoded. This operation may involve the recursive decoding of other pictures. It also depends on the availability of one or more free reconstruction buffers. The last operation consists in displaying the decoded picture.

Figure 4:
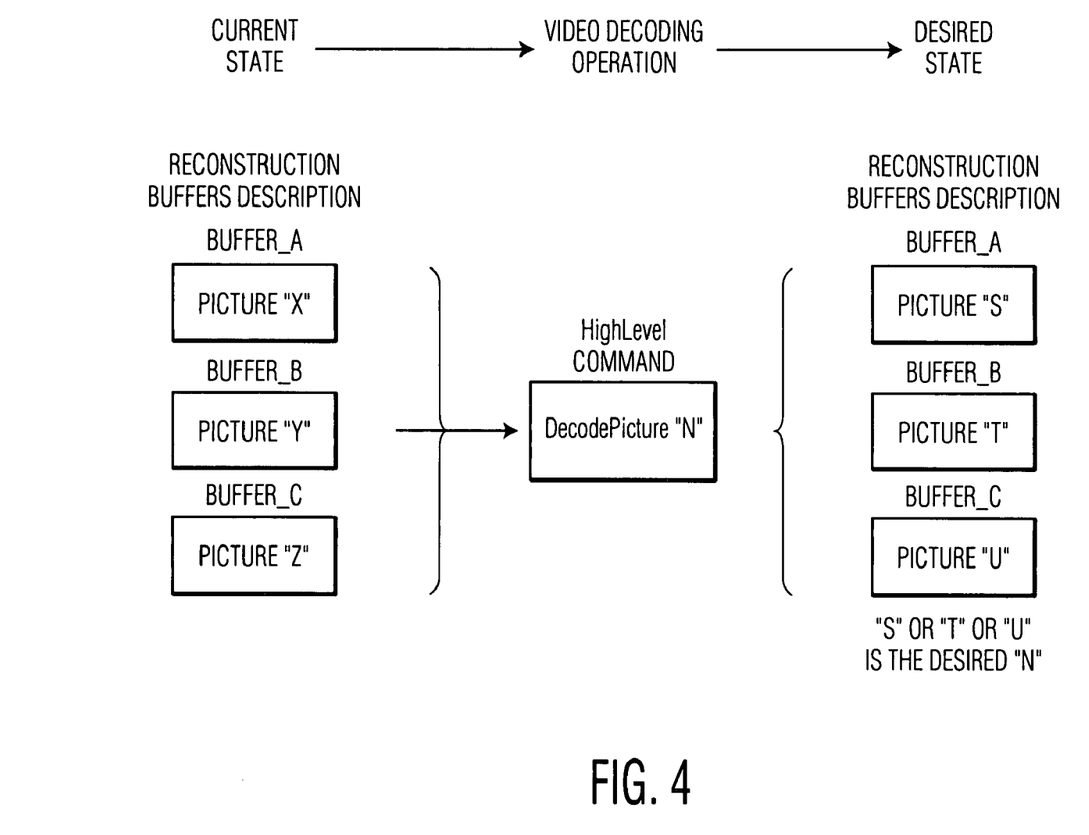
FIG. 4 is a diagram of the effect of the 'decode picture' command.

The trickmode information according to the present embodiment is a data structure comprising linked items. It is made of Picture descriptors linked with each other according to their order in the stream. The reader is reminded that the stream as received (and in this case as recorded) contains pictures in decoding order, not display order. Each Picture descriptor gives details about a picture in the MPEG coded stream as well as enough information to locate the compressed material of the picture on the storage unit. Each picture in the stream is identified with a particular Picture ID. In FIGS. 3 and 4, "N" is such a picture ID and a function 'Next(N)' returns a picture ID. The Next(N) function's processing is based on an analysis of the trickmode Information, given the type of trickmode to be displayed.

In forward mode, Next(N) returns the ID of following picture to be displayed according to normal display order (i.e. in respect to the temporal reference). In backward mode. Next(N) returns the ID of the previous picture according to normal display order.

For fast operation (forward or backward), pictures must be skipped, so Next(N) returns IDs of non-consecutive pictures.

The Next(N) function is implemented by the Overall Trickmode Control module which, knowing N, uses the trickmode tables defined in the already mentioned patent application to access all data required to decode a picture.

Slow motion trickmodes (forward or backward) are under the control of the Display Manager as this trickmode simply implies a display rate lower than one picture per 40 ms.

FIG. 4 illustrates the DecodePicture command principle. The reconstruction buffers' current state is represented to the left of the diagram. The buffers each contain certain pictures (X, Y, Z). The DecodePicture process ensures that if applied to a picture N, one of the buffers will in the end contain this requested picture, whatever the content of the other two buffers.

As already said, an MPEG picture may depend on other pictures and its decoding may require the availability of already reconstructed pictures. An MPEG coded stream always contains a number of entry points under the form of Intra pictures. None of the pictures following such an entry point may depend on pictures preceding the entry point. The DVB standard specifies that these entry points shall occur at least every 0.5 s. Open Groups of Pictures are a particular case.

Figure 5:
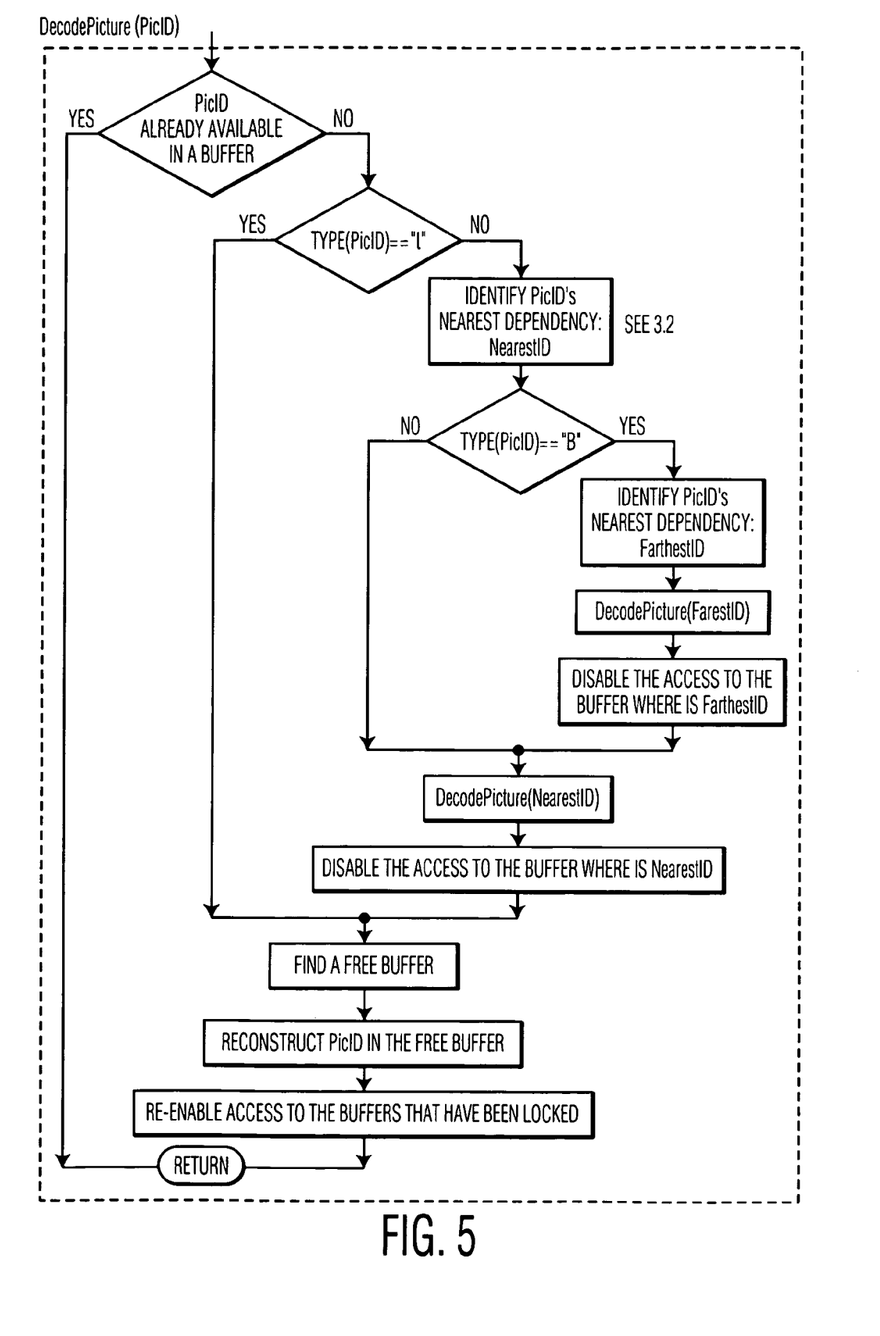
FIG. 5 is a flowchart describing the decoding process of a picture depending on its type (I, P, or B).

The DecodePicture command is implemented in a recursive way as illustrated by the flowchart of FIG. 5. If the decoding of a picture requires the presence of one or two previously decoded pictures, these latter pictures are decoded first.

If the target picture (PicID) does not yet exist in the reconstruction buffers, then it needs to be decoded. If the picture identified by PicID is of "P" or "B" type, then its decoding may require the presence of forward and backward predictors. This information is available in the trickmode tables.

The rule that gives the predictors on which a picture to be decoded depends on is simple: going through the stream backwards (i.e. towards video access units previously recorded), the first "P" type or "i" type picture encountered is the predictor for the current picture. This picture can be found using the trickmode information. This predictor is called "NearestID" in FIG. 5.

If the picture identified by PicID is a "P" type picture, NearestID is a Forward Predictor in the sense that the NearestID picture is located, in the time scale and display order, before the picture identified by PicID.

If the picture identified by PicID is a "B" type picture, NearestID is a Backward Predictor. Then the Forward Predictor is found by looking further backwards for the next "I" or "P" type picture. This Forward predictor is called "FarthestID" in FIG. 5.

In order to decode a picture, if the reconstructed predictors do not exist in the reconstruction buffers, they have to be built. In this case, the DecodePicture command is recursively repeated for these pictures.

Preceding the reconstruction of a B Picture, up to two predictors may have to be decoded, unless already decoded and present in the reconstruction buffer. As can be seen in FIG. 5, FarthestID is decoded first, followed by NearestID. Since NearestID may also depend on FarthestID, the latter is decoded first: the process is thus optimized and a double decoding of the picture corresponding to FarthestID is avoided. For example, if a B picture is predicted from two P pictures, the second P picture in time depends on the first P picture.

Once FarthestID is built into a reconstruction buffer, the buffer is locked to prevent the reconstruction process of NearestID to overwrite FarthestID, which is kept as a temporary result.

Whatever the selected playback mode, only three reconstruction buffers are used, as will now be explained:

Decoding an Intra picture requires only one free buffer, since no predictor is required. Decoding a Predictive picture requires one predictor: one or two buffers may have to be used, depending on whether the decoded predictor of the Predictive picture is already present in another buffer or not, i.e. whether a recursive decoding has to be carried out or not.

Among one of the three buffers. one contains the picture currently displayed. Thus two buffers are available for decoding further pictures—supposing they do not contain a picture to be displayed after the current picture—and thus any I or P picture may be decoded without disturbing the display of the current picture.

B pictures on the other hand require two predictors. In closed Groups of Pictures, one of the two predictors ('Nearest Predictor') will depend on the other ('Farthest Predictor'). By decoding first the farthest predictor, followed by the nearest predictor, only two buffers are required to decode both predictors. In open Groups of Pictures, both predictors may be independent, but since these predictors comprise an I picture from the current Group of Pictures and a P (or I) picture from the previous Group of Pictures, only two buffers are required as along as the P or I picture of the previous Group of Pictures is decoded first.

When the picture currently displayed is not one of the predictors for the next picture to be displayed, then assuming this next picture is of the B type, it has to be reconstructed in the buffer containing the picture currently displayed. In currently available decoders, it is often possible to start overwriting a displayed picture before it has been totally displayed. Overwriting may start for instance 20 ms after the start of the display. If a picture is displayed for several frame periods, the overwriting may of course be made during the last frame period.

It thus appears that when the decoding order is properly chosen, only three reconstruction buffers are required.

When all necessary predictors have been decoded, an available reconstruction buffer must be chosen to receive the new picture to be decoded and displayed. In some cases. there may be no choice, such as in the case of decoding a B picture: all three buffers need to be used, one for the forward predictor, one for the backward predictor and one for the B picture itself.

In other cases, a buffer out of two or three must be chosen.

The allocation of the three reconstruction buffers between display and decoding is critical for the performance of the overall system. Indeed, when the proper buffer is not chosen, an additional delay may be introduced for decoding a given picture. Depending on the processing power of the video decoder, it may then happen that a picture is not fully decoded before it is to be displayed.

The inventors have determined that in order to avoid decoding delays, the buffer to be chosen for a picture to be displayed is the free buffer that was released by the display process the longest time ago.

To implement this allocation method, a counter is associated with each buffer model element. When a picture to be displayed is reconstructed in a buffer, the counter of this buffer is reset and counters of other buffers are incremented.

According to the present embodiment, the buffer allocated to a new picture is the buffer that has the highest counter value.

Figure 6:
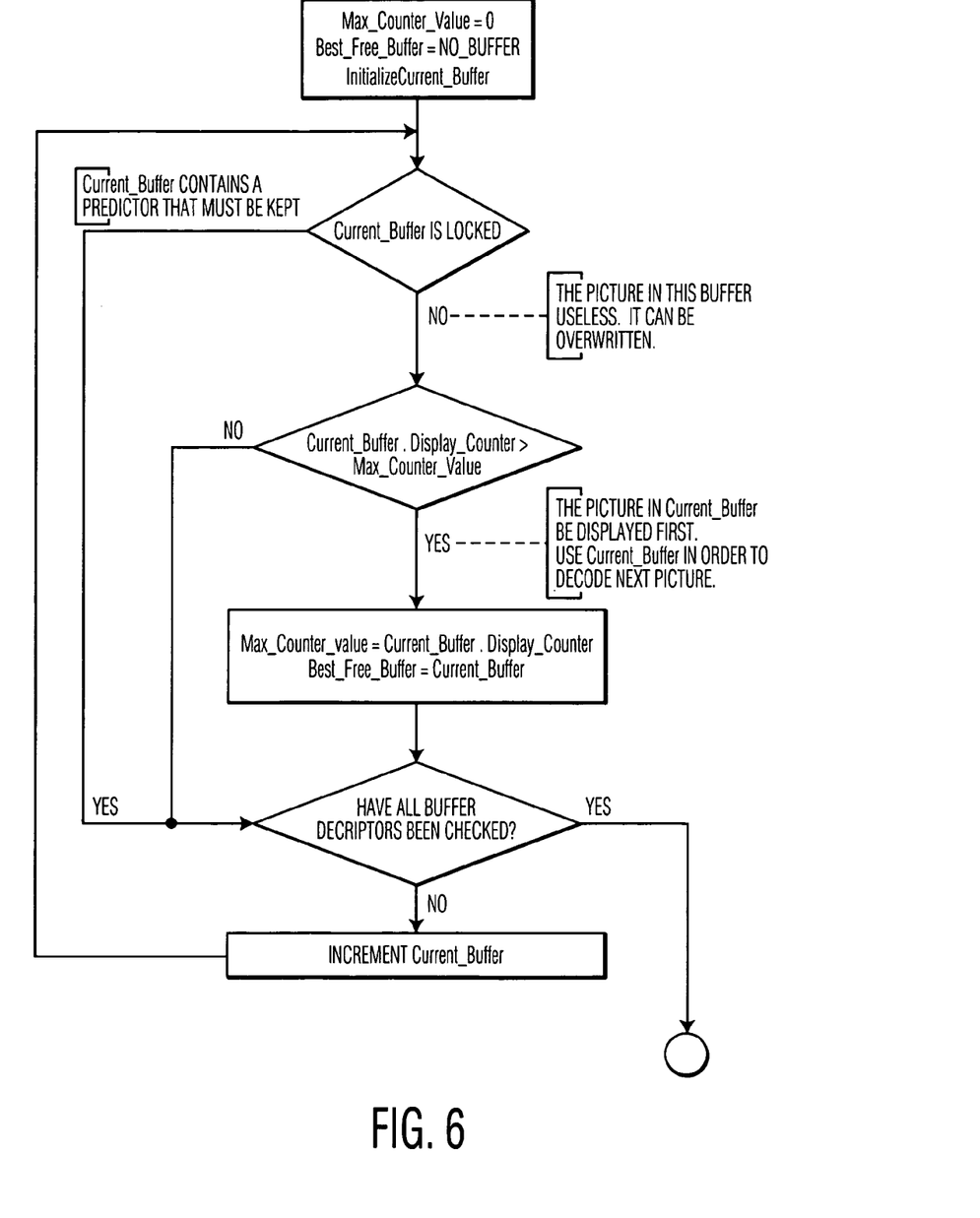
FIG. 6 is a flowchart of the empty buffer selection process according to the embodiment.

FIG. 6 is a flowchart of the buffer allocation process. It consists in cycling through all buffers, discarding those locked because containing a predictor, and selecting among the unlocked ones (if any) the one having the greatest counter value.

As described above, the picture reordering and buffer allocation problem is solved with the use of a virtual model as the following data structures one for each of the three reconstruction buffers:

```
typedef u_int8 PicID_t;
typedef struct {
    PicID_t         picID_t; <Defines the PicID of the stored
                             picture>
    Boolean         isFree_b; <Defines free/locked
                             status>
    U_int8          displayCounter_ui8; <Counter of time
the buffer has been free of a displayed picture>
}Buffer_t;
Buffer_t DecoderState_t[ BUFFER_COUNT ];
```

An example of the decoding process in reverse playback will now be described in relation with FIG. 7. This example concerns the case of open Groups of Pictures. Consider that the video stream has the following structure:

... P'11-B'9-B'10-I2-B0-B1-P5-B3-B4-P8-B6-B7-P11-B9-B10-I"2-B"00-B"1. . .

where I, P and B respectively designate Intra, Predictive and Bi-directional pictures, the number associated with each letter designating the normal order of display in the Group of Pictures. The time axis runs from left to right i.e. the 'prime' Group of Pictures is normally displayed first.

The predictors of each picture are indicated in Table 1.

TABLE 1

| Picture | Nearest Predictor | Farthest Predictor |
|---------|-------------------|--------------------|
| B"1     | I"2               | P11                |
| B"0     | I"2               | P11                |
| I"2     |                   |                    |
| B10     | P11               | P8                 |
| B9      | P11               | P8                 |
| P11     | P8                |                    |
| B7      | P8                | P5                 |
| B6      | P8                | P5                 |
| P8      | P5                |                    |
| B4      | P5                | I2                 |
| B3      | P5                | I2                 |
| P5      | I2                |                    |
| B1      | I2                | P'11               |
| B0      | I2                | P'11               |
| I2      |                   |                    |
| B'10    | P'11              | P'8                |
| B'9     | P'11              | P'8                |
| P'11    | P'8               |                    |

Figure 7:
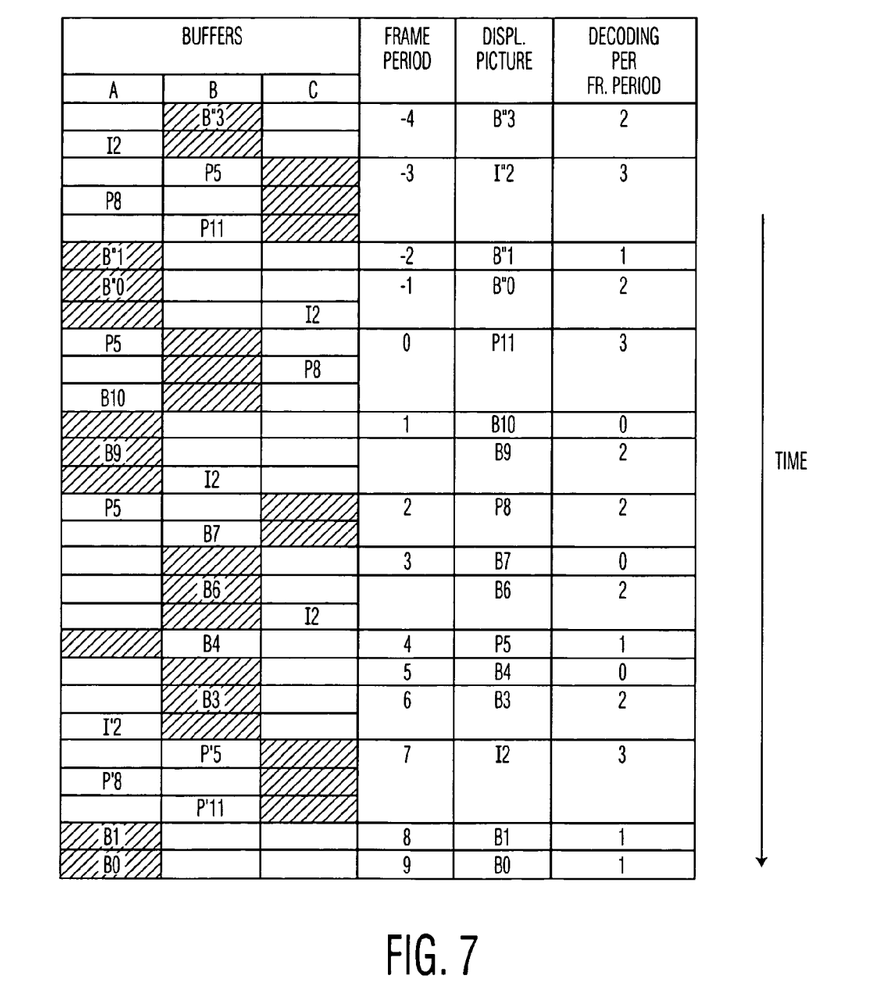
FIG. 7 is a table indicating the buffer occupancy and decoder and display activity for an example of reverse playback.

FIG. 7 indicates the content of each of the buffers A, B and C. The 'Frame Period' column counts the 40 ms display periods (whatever its thickness on the figure). The period '0' corresponds to the display period of P11. The 'Displ. Picture' column indicates which picture is displayed during the associated frame period. The 'Decoding per Fr. period' indicates the number of pictures decoded during a given 40 ms period. Grey areas indicate when the content of a given buffer is displayed.

For the sake of simplicity, frame periods, decoding periods and buffer occupancy periods are aligned. This is not necessarily so in reality. First, the time required to decode a picture depends on the picture. Second, a picture may start to be displayed before it is fully decoded. For example, if it is indicated that a picture B"1 is decoded while at the same time being displayed, this means that the display starts at the earliest 20 ms after the decoding of the picture.

Let us suppose the pictures P11 to B0 are to be displayed in this order.

FIG. 7 lists in the order of decoding all the pictures (whether to be displayed or not) determined by the recursive process described above.

P11 depends on P8, depending in turn on P5. depending in turn on I2. Consequently, I2 is decoded in buffer A during period −4, P5 during period −3, P8 also during period −3. During period −4, picture B"3 is displayed, while during period −3, picture I"2 is displayed. As can be seen, during period −3, three pictures need to be decoded. The fourth picture required, I2, is decoded during the previous period, since buffer A is available. During that same period, buffers B and C are not available, because buffer B contains the displayed picture B"3 and buffer C is locked because containing the next picture to be displayed, I"2. As can be seen, the decoding of a picture is limited by the availability of unlocked buffers, and pictures are decoded in the order in which they are required as soon as possible.

Since we use open Groups of Pictures in this example, P11 is not decoded to be displayed at this point, but to serve as predictor for pictures B"1 and B"0. The other predictor of these two pictures is I"2, already present in buffer C at this point. B"1 and B"0 can thus be decoded and displayed immediately (i.e. 20 ms after decoding has started).

P11 is then to be displayed. Since it is already present in buffer B, no new decoding has to be carried out for this picture and it can be immediately displayed.

At the end of period −1, the buffer C becomes available because B"0 has been decoded and its predictors, stored in buffers B and C, become useless. Thus I2 is decoded, as a first step towards decoding B10, depending on I2, P5, P8 and P11. Decoding of the other pictures follows a similar pattern.

The invention claimed is:

1. Method for decoding compressed video pictures in a video decoding device comprising a random access source of coded video pictures, a video decoder and a plurality of reconstruction buffers for storing decoded pictures, said method comprising the steps of:
    establishing an order of decoding pictures by determining a list of pictures to be displayed among pictures in said stream;
    recursively determining chains of predictors for said pictures to be displayed, and inserting said predictors in said list of pictures to be displayed in the order required for decoding predictors before pictures depending on said predictors; and
    commanding said video decoder to decode a picture upon availability of a reconstruction buffer.

2. Method according to claim 1, comprising the steps of:
    locking access to a reconstruction buffer containing a picture to be displayed until display of said picture;
    commanding the decoding of a further picture upon availability of an unlocked reconstruction buffer.

3. Method according to claim 1, wherein said compressed video stream comprises pictures in the order of decoding, further comprising the steps of determining for a bidirectional picture a nearest and a farthest predictor, where said nearest predictor is the picture appearing in the stream closest to said bi-directional picture, said farthest predictor being decoded prior to said nearest predictor.

4. Method according to claim 3, wherein said step of determining an order of decoding pictures comprises the steps of:
   loading predetermined information descriptive of the contents of the video stream, and
   deriving said order of decoding pictures from said information as a function of a selected display mode.

5. Method according to claim 4, further comprising the step of selecting a reconstruction buffer among available reconstruction buffers for storage of a decoded picture, said selection being carried out so as to select the available reconstruction buffer in which no decoded picture to be displayed has been stored for the longest time.

6. Method according to claim 5, further comprising the step of attributing a counter to each reconstruction buffer, of incrementing each counter every time a picture is displayed, of resetting a counter when a picture of its associated buffer is displayed and of attributing the buffer with the highest counter value to a picture to be decoded.

7. Method according to claim 6, carried out using only three reconstruction buffers.

8. Method according to claim 7, further comprising the steps of verifying prior to deciding the decoding of a picture, whether said picture is already present in one of the reconstruction buffers, and of avoiding a second decoding of said picture in this case.

9. Video decoding device comprising:
   a random access source of a compressed video stream including coded pictures;
   means for selecting pictures to be decoded;
   a plurality of reconstruction buffers for storing decoded pictures;
   a video decoder for decoding coded pictures;
   means for monitoring the availability for write access of reconstruction buffers and for controlling said video decoder to decode a selected picture upon availability of a reconstruction buffer, wherein the availability of a reconstruction buffer is determined by the status of the display of a picture contained in said reconstruction buffer.

* * * * *